United States Patent [19]

Yamamoto et al.

[11] Patent Number: 4,672,433
[45] Date of Patent: Jun. 9, 1987

[54] COLOR SIGNAL PROCESSING APPARATUS WITH A SIGNAL INTERPOLATION FUNCTION FOR USE IN A COLOR COPIER

[75] Inventors: Naofumi Yamamoto, Tokyo; Hidekazu Sekizawa; Tutomu Saito, both of Yokohama, all of Japan

[73] Assignee: Kabushiki Kaisha Toshiba, Kawasaki, Japan

[21] Appl. No.: 811,477

[22] Filed: Dec. 20, 1985

[30] Foreign Application Priority Data

Dec. 27, 1984 [JP] Japan ............................ 59-274128

[51] Int. Cl.[4] .............................................. H04N 1/46
[52] U.S. Cl. ......................................... 358/80; 358/75
[58] Field of Search .............................. 358/75, 78, 80

[56] References Cited

U.S. PATENT DOCUMENTS

| | | | |
|---|---|---|---|
| 4,511,989 | 4/1985 | Sakamoto | 358/80 |
| 4,591,905 | 5/1986 | Noguchi | 358/75 |
| 4,602,294 | 7/1986 | Yamada | 358/80 |
| 4,603,348 | 7/1986 | Yamada | 358/75 |
| 4,623,973 | 11/1986 | Hoffrichter | 358/80 |
| 4,626,902 | 12/1986 | Yamada | 358/75 |

OTHER PUBLICATIONS

1984 Image Electronics Society, Preprint of 12th National Meeting, No. 32 entitled "A Color Filter Array & Read Quality of a Sensor for a Color Facsimile"-no translation.

Primary Examiner—Howard W. Britton
Attorney, Agent, or Firm—Oblon, Fisher, Spivak, McClelland & Maier

[57] ABSTRACT

In a color picture reproducing apparatus, a color light receiving element array has light receiving element which are arrayed in one line and have color separation filters. At least three light receiving elements are assigned for each pixel. The apparatus picks up color signals for each pixel, and reproduces a color picture for each pixel using these picked up color signals. The color signals, which are derived from the pixels of the array on which a portion of a color picture, such as an edge of a black character picture is imaged, inevitably contain errors arising from positional differences between the light receiving elements in one pixel. The errors deteriorate the quality of a reproduced picture. To prevent this, a color signal processing circuit is arranged to interpolate the color signals from adjacent pixels according to the positions of the light receiving elements in one pixel. A signal interpolating circuit for the signal interpolation may separately be provided. Alternatively, a color signal converting circuit may be arranged to perform the signal interpolating function.

11 Claims, 11 Drawing Figures

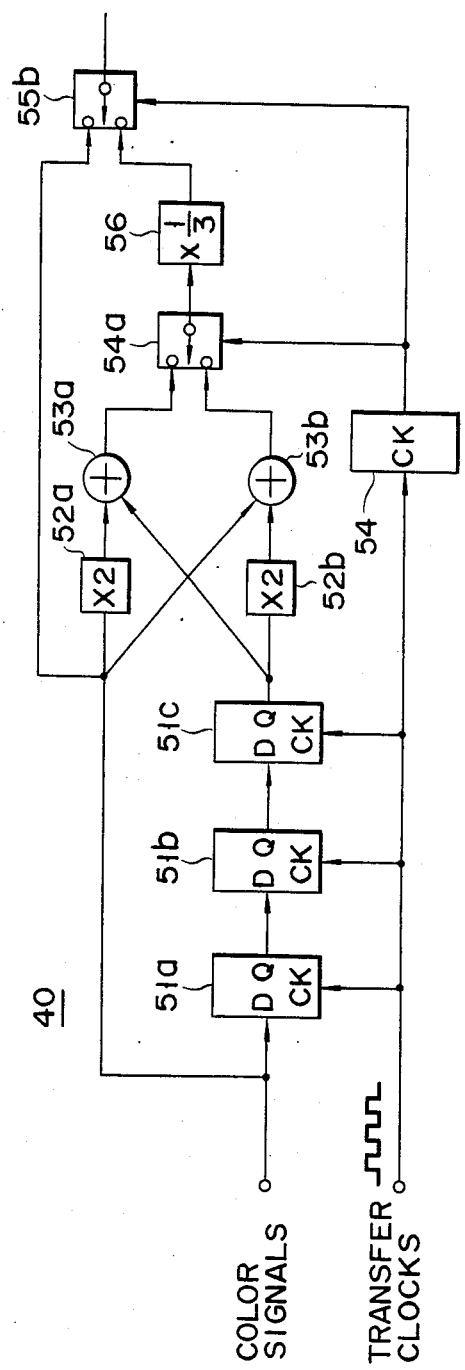

COLOR SIGNAL PROCESSING APPARATUS WITH A SIGNAL INTERPOLATION FUNCTION FOR USE IN A COLOR COPIER

BACKGROUND OF THE INVENTION

The present invention relates to an apparatus for processing color picture information signals for use in a color copier using an image sensor with a plurality of light receiving elements assigned for each picture element.

Conventional color copying technology involves two categories: an electronic color picture reproduction system and a chemical color picture reproduction system. The former uses, for color picture reproduction, electrical signals obtained by optically scanning a color original picture. The latter employs a chemical process, such as development process for color picture reproduction.

The electrical color picture reproduction system is, at the present stage of technology, liable to be adversely affected with noises and is low in resolution, although having attractive advantages of no need for chemical process and of possibility of various processings for the color image reproduction.

With this electrical reproduction system, to obtain three color signals for reproducing a color picture, there are needed at least three color filter elements with different spectral characteristics for each pixel.

The following systems, each of which employs a light receiving element array such as a CCD (charge coupled device) array to obtain three color signals for each pixel, have been known.

(1) According to a first system, one light receiving element is assigned to one pixel. Three-color light sources or three color filters provided for one pixel are sequentially switched to provide three color signals for each pixel on a time division basis.

(2) According to a second system, a spatially dividing type image sensor is used in which three light receiving elements are assigned for one pixel. The three light receiving elements are respectively provided with different color filters, to provide three color signals.

The second system is disadvantageous over the first system in that three times as many as light receiving elements are required and that the three color signals for one pixel are not exactly representative of picture information at a point on the original picture. Conversely, the second system has no need of a moving device to switch the light sources or the color filters, resulting in high-speed readout of picture information. Owing to this feature, the second system has predominantly been employed for picture information reproduction.

Strictly speaking, in the color copier using the spatially dividing type image sensor the color signals corresponding to one pixel are color signals corresponding to separate points on the color picture. In a picture portion where variation in brightness is small an influence imposed by the spatially dividing type image sensor on a reproduced color picture is negligibly small due to deterioration of high frequency components cause by a distributed index rod lens array. In picture portions where luminance greatly varies, such as edges in a black character picture, however, unnegligible errors occur in signals during color signal processing. Such errors also occur in a chromatic edge portion and a dot picture (color picture printed by printing machines). This causes deterioration in color reproducibility and picture quality of a reproduced color picture.

SUMMARY OF THE INVENTION

An object of this invention is to provide an improved color picture signal processing apparatus.

Another object of the present invention is to provide a color signal processing apparatus for use in a color copier using a spatially dividing type image sensor, which can reduce errors which occur in color signals during color signal processing due to the structure of the image sensor.

To achieve the above objects, in a color signal processing apparatus for use in a color picture reproducing apparatus having a color light receiving element array including light receiving elements, each having a light receiving surface, arrayed in one line and color separation filters disposed on the light receiving surfaces of the light receiving elements three or more of which define one picture element, and in which a plurality of color signals for each picture element are sequentially picked up by scanning an original color picture to be reproduced by using the color light receiving element array, and a color picture is reproduced for each picture element using the picked up color signals, an interpolation operation circuit means is provided which is connected to receive the color signals from the color light receiving element array for interpolating color signals of adjacent picture elements arrayed in one line in order to reduce errors in color signals which are caused by the positional differences between the light receiving elements.

BRIEF DESCRIPTION OF THE DRAWINGS

FIG. 5 is a block diagram of an interpolation circuit used in FIG. 4;

FIG. 6 is a diagram for explaining a signal interpolation method employed in the first embodiment of the present invention;

DETAILED DESCRIPTION OF THE PREFERRED EMBODIMENTS

Figure 1:
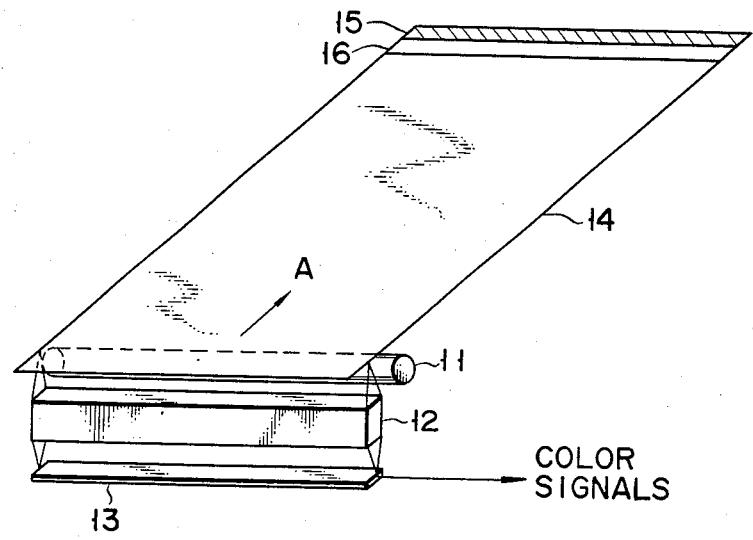
FIG. 1 schematically shows a conventional color copier to which the present invention is applied.
Figure 2:
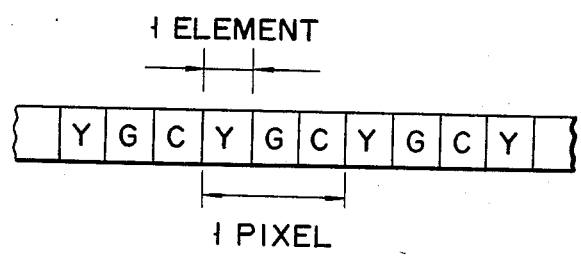
FIG. 2 is a diagram for explaining a color light receiving element array used in the color copier of FIG. 1.

For a better understanding of the present invention, a conventional color copier using a spatially dividing type image sensor will be described referring to FIGS. 1 to 3. An image reader section of the color copier comprises, as shown in FIG. 1, linear light source 11, a distributed index rod lens array 12, which is known as trade mark "SELFOC", and a spatially dividing type color light receiving element array (image sensor) 13. Image sensor 13 is formed of a charge coupled device (CCD). In image sensor 13, color separation filter elements for yellow (Y), green (G), and cyan (C), for example, are sequentially disposed on respective light receiving elements, as shown in FIG. 2. A glass plate 14, on which an input color picture to be copied is placed, is disposed above the image reader section. A black colored reference plate 15 and a white colored reference plate 16 are disposed on one end of glass plate 14.

An input picture is two-dimensionally scanned by the reader section. The main scanning of the input picture in line direction along the width of the input picture is electrically performed by image sensor 13. The sub-scanning in the vertical direction of the input picture is performed by mechanically moving the image reader section as indicated by an arrow A.

In this copier, black and white reference plates 15 and 16 are scanned before the input picture is scanned. Black and white level reference signals obtained by scanning these reference plates are used for normalizing picture signals obtained from the input picture. One line on the input picture illuminated by light source 11 is imaged onto image sensor 13 by distributed index rod lens array 12, with one-to-one magnification.

Three color filters are provided for the three light receiving elements in one pixel. Accordingly, time-series color signals consisting of Y, G and C color signals are derived from image sensor 13 for each of pixels on one line.

Figure 3:
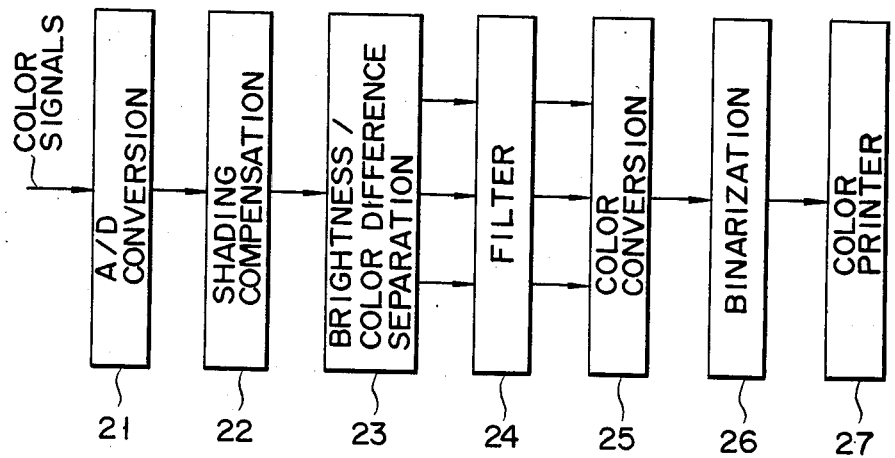
FIG. 3 is a block diagram of a color signal processing circuit used in FIG. 1.

With reference to FIG. 3, the picture information signals picked up by image sensor 12 are digitized by an analog/digital (A/D) converter 21. The digital signals are then applied to a shading compensation circuit 22. The shading compensation circuit 22 is adpated for compensating variation in sensitivity between light receiving elements, irregularity of illumination of light source, and white color transmission factors of color filters. The shading compensation is made by normalizing the picture information signals by the black and white reference signals.

The normalized picture information signals are applied to a brightness and color-difference separation circuit 23 for forming a brightness signal I and color-difference signals C1 and C2. The brightness signal I and color-difference signals C1 and C2 are formed by the following matrix conversion $$\begin{pmatrix} I \\ C1 \\ C2 \end{pmatrix} = \begin{pmatrix} \frac{1}{3} & \frac{1}{3} & \frac{1}{3} \\ 1.5 & -1.5 & 0 \\ 0 & 3.5 & -3.5 \end{pmatrix} \begin{pmatrix} Y \\ G \\ C \end{pmatrix} \quad (1)$$

The brightness signal I and the color-difference signals C1 and C2 are applied to a filter circuit 24. In this circuit 24, in view of different spatial resolutions of human eyes for brightness and colors, the brightness signal I is subjected to high-frequency emphasizing processing and the color-difference signals C1 and C2 are subjected to averaging processing. The filtered brightness and color-difference signals are applied to a color conversion circuit 25 to produce ink-amount signals representing amounts of three color inks used to print a color represented by the brightness signal and the color-difference signals.

When a thermal printer with bi-level outputs is employed for a color output device or a color printer 27, the ink amount signals are bi-level quantized by a binarizing circuit 26. Due to binarization processing using a dither technique a high-quality color picture can be reproduced.

With the conventional color copier as described above, the color signals for one pixel are signals corresponding to three points different in position on the input picture. Accordingly, in the case of a picture with little variation in brightness, due to the high-frequency deterioration caused by the lens in the image reader section, the use of different-position signals does not essentially influence the quality of a reproduced picture. In the case of a black character picture, however, error occurs in the color-difference signals corresponding to edges of the character. The result is that the normalized color signals for one pixel become different in value from one another in spite of an achromatic portion. Further, the color-difference signals are not zero, causing errors. Also at edges of an chromatic picture, errors occur in the color-difference signals. Further in the case of relatively coarse dots on a picture formed of halftone dots, like phenomena tends to occur.

Figure 4:
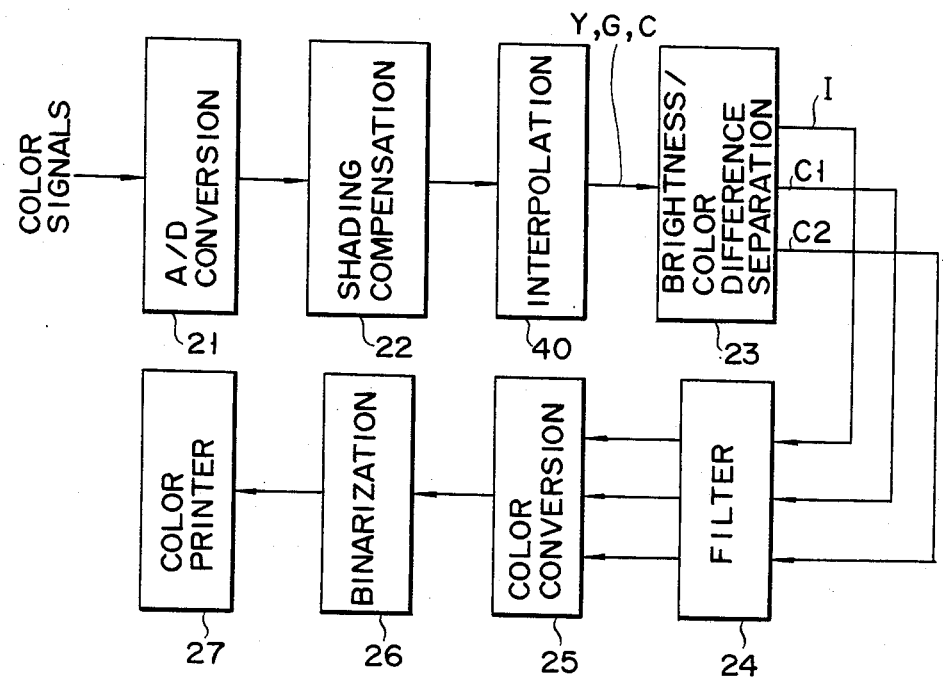
FIG. 4 is a block diagram of a color signal processing apparatus according to an embodiment of the present invention.

An embodiment of a color signal processing circuit according to the present invention will be given referring to FIG. 4. In the figure, like or equivalent portions are designated by like reference numerals in FIG. 3. This processing circuit is featured by provision of a signal interpolation circuit 40 between shading compensation circuit 22 and brightness/color-difference separation circuit 23.

Interpolation circuit 40 sequentially receives color signals $Gn-1$, $Cn-1$, $Yn$, $Gn$ and $Cn$ for adjacent pixels from compensation circuit 22, and performs the following operations.

$$Yn' = Yn \quad (2)$$

$$Gn' = (\tfrac{1}{3})Gn - 1 + (\tfrac{2}{3})Gn$$

$$Cn' = (\tfrac{2}{3})Cn - 1 + (\tfrac{1}{3})Cn$$

$Yn'$, $Gn'$ and $Cn'$ are interpolated color signals, and serially applied to brightness/color-difference separation circuit 23.

Signal interpolation circuit 40 may be arranged as shown in FIG. 5. In the FIG. 51a to 51c designate latch circuits each of which delays an input signal by a time corresponding to a transfer time of one pixel. 52a and 52b designate two-hold multipliers. 53a and 53b represent adders. 54 represents a scale-of-3 counter. 55a and 55b denote select circuits responsive to counter 54. 56 denotes a divide-by-3 divider.

When an input signal Xn is applied to an input of interpolation circuit 40, adder 53a produces $2Xn+X(n-1)$, and adder 53b produces $Xn+2X(n-1)$. Selectors 55a and 55b operate in response to scale-of-3 counter 54. For the input signal Y selector 55b selects the input signal Y applied to the input of interpolation circuit 40 to produce an output signal Yn' as Y. For the input signal G, selector 55a selects the output of adder 53b and selector 55b selects the output of divider 56 so that the output signal Gn' in equation (2) is obtained. Similarly, for the input signal C, selector 55a selects the output of adder 53a and selector 55b selects the output of divider 56, thereby producing the output signal Cn'.

The meaning of the interpolation operation will be described with reference to FIG. 6. It is assumed that light receiving elements for producing color signals Yn, Gn and Cn for the n−th pixel are located at positions P(Yn), P(Gn) and P(Cn), as shown. The brightness differences at the positions P(Yn), G(Gn) and P(Cn) result in differences in color signals at the n−th pixel. It may be considered that a light amount distribution and a spectral distribution linearly vary in a region from P(Gn−1) to P(Cn). A signal value Gn' that is obtained by interpolating signals Gn and Gn−1 at positions P(Gn) and P(Gn−1) according to the following formula is approximately equal to G signal at position (Yn).

$$\overline{P(Gn-1)P(Yn)}:\overline{P(Yn)P(Gn)} = 2:1$$

This interpolating operation is based on the fact that a ratio of a distance between centers of the Gn−1 and Yn elements to a distance between centers of the Yn and Gn elements is 2:1.

Similarly, a signal Cn' as obtained by the interpolation using the following formula is approximately equal to C signal at P(Yn).

$$\overline{P(Cn-1)P(Yn)}:\overline{P(Yn)P(Cn)} = 1:2$$

With Yn'=Yn, Yn' represents a Y signal at P(Yn).

Interpolating circuit 40 is arranged, on the basis of the principle as mentioned above, to produce the interpolated color signals Yn', Gn' and Cn' representative of color signals at P(Yn) from the normalized color signals Yn, Gn and Cn.

Through the interpolation processing as mentioned above, errors in color signals corresponding to character pictures and color pictures formed of coarse dots are removed, thereby to reproduce high quality color pictures.

It is preferable that interpolating circuit 40 is located between shading compensation circuit 22 and brightness/color-difference separation circuit 23. If necessary, it may be located between filter circuit 24 and color conversion circuit 25.

Figure 7:
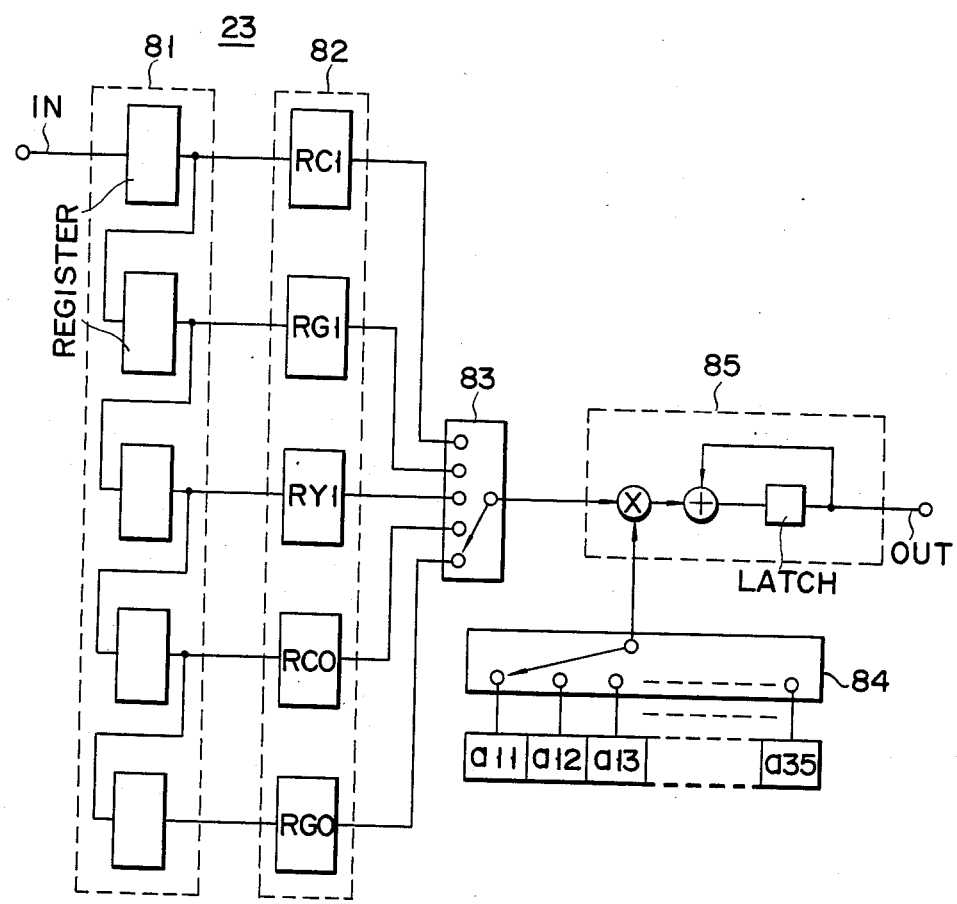
FIG. 7 is a block diagram of a brightness/color dirference separation circuit with an interpolation function, which is a second embodiment of the present invention.
Figure 8:
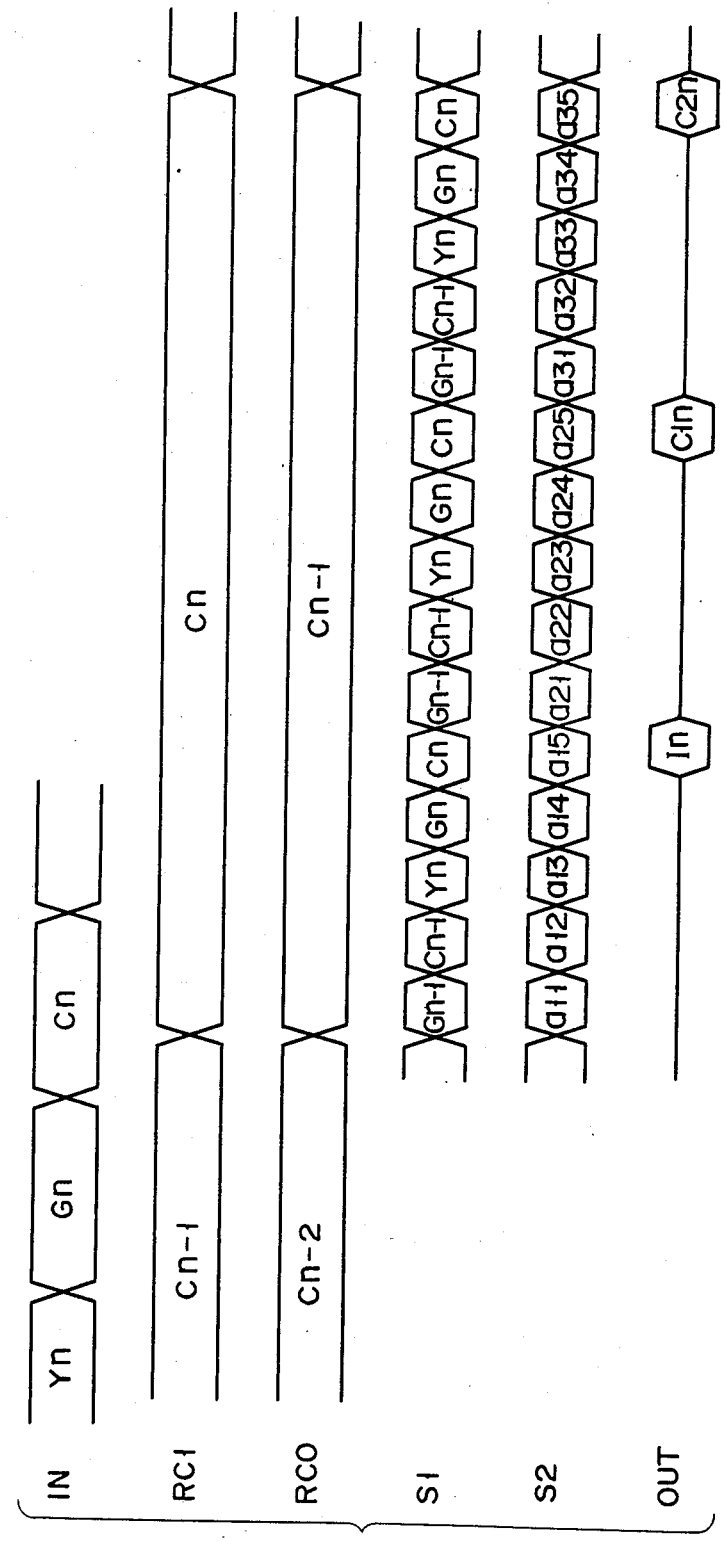
FIG. 8 shows a timing chart useful in explaining the operation of the circuit of FIG. 7.

Another embodiment of the present invention will be given referring to FIGS. 7 and 8. This embodiment is featured in that the interpolation is performed in brightness/color-difference separation circuit. Assuming that input signals IN corresponding to the n−th pixel are Yn, Gn and Cn, and interpolated luminance and color-difference signals are In, C1n, and C2n, the interpolation processing is achieved as follows:

$$\begin{pmatrix} In \\ C1n \\ C2n \end{pmatrix} = \begin{pmatrix} Yn/3 + (2Gn/3 + Gn - 1/3)/3 + (Cn/3 + 2Cn - 1/3)/3 \\ 1.5Yn - 1.5(2Gn/3 + Gn - 1/3) \\ 3.5(2Gn/3 + Gn - 1/3) - 3.5(Cn/3 + 2Cn - 1/3) \end{pmatrix} \tag{3}$$

$$= \begin{pmatrix} 1/9 & 2/9 & 1/3 & 2/9 & 1/9 \\ -0.5 & 0 & 1.5 & -1 & 0 \\ 3.5/3 & -7/3 & 0 & 7/3 & -3.5/3 \end{pmatrix} \begin{pmatrix} Gn-1 \\ Cn-1 \\ Yn \\ Gn \\ Cn \end{pmatrix}$$

This expression can be considered to be a combination of expression (1) for the brightness/color-difference separation, and expression (2) for the interpolation in the first embodiment. This means that the interpolation and the brightness/color-difference separation can both be processed by a single circuit.

The brightness/color-difference separation circuit of this embodiment, comprises a serial/parallel conversion circuit 80, a select circuit 83 for sequentially selecting one of five outputs of converter 80, a select circuit 84 for sequentially selecting one of 15 parameters aij, and a sum-of-products operation circuit 85 for performing a sum-of-products operation using output data of selectors 83 and 84, viz. for applying a matrix operation to color signals from selector 83. The parallel/serial conversion circuit 80 includes a serial shift registers 81 having five stages each storing a color signal, and parallel register 82 having five stages connected in parallel to the stages of register 81.

In registers 81 and 82 are stored color signals Yn, Gn and Cn for the n−th pixel, and color signals Gn−1 and Cn−1 for the (n−1)th pixel preceding to the n−th pixel. As shown in a timing chart of FIG. 8, the sum-of-products operation is performed fifteen times within the transfer time of one pixel, using the five outputs of parallel register 82 and the fifteen parameters all to a35, so that the interpolated output signals In, C1n and C2n are produced by the above matrix operation. In this embodiment, the parameters a11 to a35 may be varied to enhance the flexibility of the interpolation processing.

Figure 9:
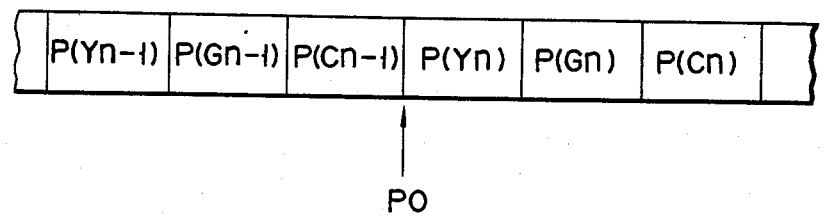
FIG. 9 is a diagram for explaining a signal interpolation method according to a third embodiment of the present invention.

A further embodiment of the present invention will be described referring to FIG. 9. The following matrix expression describes the interpolating process of this embodiment.

$$\begin{pmatrix} In \\ C1n \\ C2n \end{pmatrix} = \begin{pmatrix} Yn/3 + 1/3(G(n-1)/2 + Gn/2) + C(n-1)/3 \\ 1.5Yn - 1.5(G(n-1)/3 + 2Gn/3) \\ 3.5(2Gn - 1/3 + Gn/3) - 3.5Cn - 1 \end{pmatrix} \tag{4}$$

$$= \begin{pmatrix} 1/6 & 1/3 & 1/3 & 1/6 \\ -0.5 & 0 & 1.5 & -1 \\ 7/3 & -3.5 & 0 & 3.5/3 \end{pmatrix} \begin{pmatrix} Gn-1 \\ Cn-1 \\ Yn \\ Gn \end{pmatrix}$$

The embodiment performs both the brightness/color-difference separation and the interpolation using the color signals Gn−1, Cn−1, Yn and Gn. It is assumed that the positions of the color light receiving elements for producing color signals Yn, Gn and Cn are P(Yn), P(Gn) and P(Cn), as shown in FIG. 9. For the interpolation operation to obtain In, an interpolated color signal G(=G(n−1)/2+Gn/2) at the mid point Po between P(Cn−1) and P(Yn) is used. The G signal at P(Yn) interpolated by Gn and Gn−1 as Gn−⅓+2Gn/3 is used for interpolation of the signal C1. For the interpolation to obtain the signal C2n, an interpolated signal $G(=2Gn-\frac{1}{3}+Gn/3)$ at P(Cn−1) is used. With this embodiment, C1n is derived from a color signal and an interpolated color signal at the same point. This is the case for C2n. However, C1n and C2n are signals at different points. Thus, In, C1n, C2n represent signals at different points. The errors caused in the color difference signals due to brightness variation can be substantially removed.

The present embodiment has advantages that, because of the matrix operation of 3×4, the number of stages of the serial and parallel registers is reduced, and the times of the sum-of-products operations is reduced to 12.

A fourth embodiment of the present invention will be described referring to FIG. 10. In this embodiment, a pair of light receiving elements are provided for each of colors Y, G and C of one pixel. Output signals of each pair of the light receiving elements are added together. Three added signals are output as three color output signals of one pixel.

Figure 10:
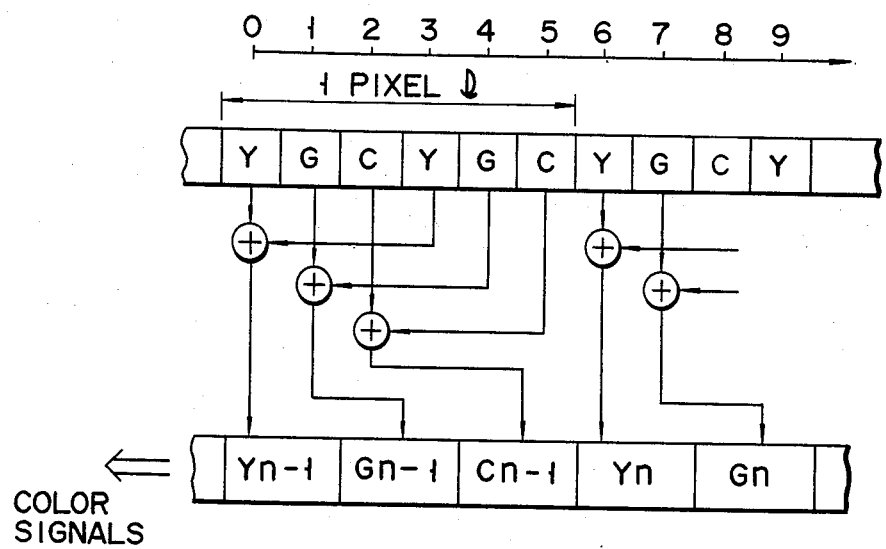
FIG. 10 is a diagram for explaining a signal interpolation method according to fourth embodiment of the present invention.

In FIG. 10, it is assumed that in a coordinate system in which the origin is at the center of the light receiving element with Y filter positioned at the left most end, the pitch of light receiving elements is unity which corresponds to a unit of the coordinate system. The color signal Gn−1 is the sum of output signals of light receiving elements at coordinates 1 and 4, and 2.5. The color signals Cn−1, Yn, Gn and Cn likewise represent color information at the coordinates 3.5, 7.5, 8.5, and 9.5, respectively. The color signals at coordinate 7.5, for example, can be obtained by $$Yn' = Yn \quad (5)$$

$$Gn' = (Gn - 1)/6 + 5Gn/6$$

$$Cn' = (Cn - 1)/3 + 2Cn/3$$

The light receiving array of this embodiment brings about an advantage as given below. In the case of the array shown in FIG. 2, the attenuation of its spatial frequency characteristic is small in a region beyond the Nyquist frequency $\pi/l$ so that the areasing noise is large. In the array of FIG. 10, on the other hand, the attenuation is large, and therefore the areasing noise is reduced. l indicates the length of one pixel.

Figure 11:
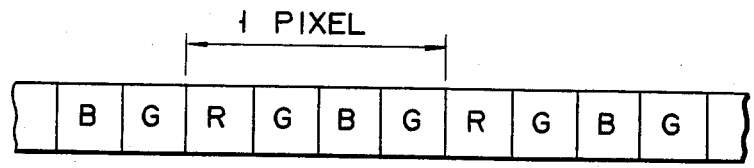
FIG. 11 is a diagram for explaining a signal interpolation method of a further embodiment of the present invention.

A fifth embodiment of the present invention will be given referring to FIG. 11. In this embodiment, each pixel contains four elements on which color filters of red (R), green (G), blue (B) and green (G) are arranged in this order.

The brightness signal I and the color-difference signals C1 and C2 are defined as follows:

$$I = G$$

$$C1 = R-G$$

$$C2 = B-G$$

These signals are different from those in the previous embodiments, but not different in that the brightness signal I represents brightness of pixel and the color difference signals C1 and C2, the hues of the pixel.

With such an arrangement, it is assumed that a color signal derived from the R element is used for the color-difference signal C1, and a color signal from the B element for the color-difference signal C2. If the brightness signal and the color-difference signals for the n−th pixel are calculated using the following expressions (6), a color-difference error due to a brightness inclination can be removed.

$$In = Gn \quad (6)$$

$$C1n = Rn - (G'n - 1 + Gn)/2$$

$$C2n = Bn - (G'n + Gn)/2$$

where Rn, Gn, Bn and G'n designate color signals derived from the n−th pixel.

While the embodiments of the present invention thus far described are applied to color copiers, the present invention may be applied to a color image input device for producing color signals R, G and B. An approximate conversion of color signals Y, G and C to color signals R, G and B can be made as follows:

$$\begin{pmatrix} R \\ G \\ B \end{pmatrix} = \begin{pmatrix} 2 & -1 & 0 \\ 0 & 1 & 0 \\ 0 & -1 & 2 \end{pmatrix} \begin{pmatrix} Y \\ G \\ C \end{pmatrix} \quad (7)$$

Exactly, the matrix coefficients in the above expression must be corrected according to spectral distributions of Y, G and C color filters.

What is claimed:

1. A color signal processing apparatus for use in a color picture reproducing apparatus having a color light receiving element array including light receiving elements arrayed in one line and each having a light receiving surface, and color separation filters disposed on said light receiving surfaces of said light receiving elements three or more of which define one picture element, and in which a plurality of color signals for each picture element are sequentially picked up by scanning an original color picture to be reproduced by using said color light receiving element array, and a color picture is reproduced for each picture element on the basis of the color signals, said color signal processing apparatus comprising:

interpolation operation circuit means connected to receive the color signals from said color light receiving element array for performing an interpolation operation among color signals for adjacent picture elements in order to reduce errors in the color signals representing one picture element which are caused by positional difference in said light receiving elements in each picture element.

2. The apparatus according to claim 1, in which an interpolation operation circuit for performing only the interpolation operation is separately provided.

3. The apparatus according to claim 1, further comprising circuit means connected to receive color signals for each picture element from said color light receiving element array for forming a brightness signal representing the brightness of each picture element and color-difference signals representing the hue of each picture element; and wherein said interpolation operation circuit means is provided at the preceeding stage of said brightness signal/color-difference signal forming circuit means.

4. The apparatus according claim 3, wherein said color light receiving element array is so arranged as to produce color signals of yellow (Y), green (G) and cyan (C) for each picture element, and said interpolation operation circuit means is arranged to perform the following operations and to produce interpolated color signals Yn', Gn' and Cn'

$$Yn' = Yn$$

$$Gn' = (\tfrac{1}{9})Gn-1 + (\tfrac{8}{9})Gn$$

$$Cn' = (\tfrac{8}{9})Cn-1 + (\tfrac{1}{9})Cn$$

where Yn, Gn and Cn are color signals for the n−th picture element, and Yn−1, Gn−1 and Cn−1 are color signals for the (n−1)th picture element.

5. The apparatus according to claim 3, in which said color light receiving element array has pairs of light receiving elements for each picture element having color separation filters of yellow (Y), green (G) and cyan (C), respectively, output signals of paired light receiving elements having the same color separation filter being added together, and
further comprising circuit means connected to receive color signals for each picture element from said color light receiving element array for forming a luminance signal representing the brightness of each picture element and color-difference signals representing the hue of the each picture element; and
wherein said interpolation operation circuit means is disposed at the preceeding stage of said brightness signal/color-difference signal forming circuit means.

6. The apparatus according claim 5, wherein said interpolation operation circuit means is arranged to perform the following operations and to produce interpolated color signals Yn', Gn' and Cn'

$$Yn' = Yn$$

$$Gn' = (1/6)Gn-1 + (5/6)Gn$$

$$Cn' = (\tfrac{1}{3})Cn-1 + (\tfrac{2}{3})Cn$$

where Yn, Gn and Cn are color signals for the n−th picture element, and Yn−1, Gn−1 and Cn−1 are color signals for the (n−1)th picture element.

7. The apparatus according to claim 1, in which said interpolation operation circuit means is connected to receive color signals for each picture element from said color light receiving element array, and is arranged to combine these color signals into other color signals.

8. The apparatus according to claim 7, in which said color light receiving element array has four light receiving elements having color separation filters of red (R), green (G), blue (B), and green (G') for each picture element, and said interpolation operation circuit means is arranged to perform the following operations and produces a brightness signal In, and color-difference signals C1n and C2n for the n−th picture element $$In = Gn$$

$$C1n = Rn - (G'n-1 + Gn)/2$$

$$C2n = Bn - (G'n + Gn)/2$$

where Rn, Gn, Bn and G'n are color signals for the n−th picture element, and Rn−1, Gn−1, Bn−1 and G'n−1 are color signals for the (n−1)th picture element.

9. The apparatus according to claim 7, in which said interpolation operation circuit means is connected to receive color signals from said color light receiving element array, and arranged to form a brightness signal representing the brightness of each picture element and color-difference signals representing the hue of the each picture element.

10. The apparatus according claim 9, wherein said color light receiving element array is arranged to produce color signals of yellow (Y), green (G) and cyan (C) for each picture element, and said interpolation operation circuit means is arranged to perform an operation as follows:

$$\begin{pmatrix} In \\ C1n \\ C2n \end{pmatrix} = \begin{pmatrix} 1/9 & 2/9 & 1/3 & 2/9 & 1/9 \\ -0.5 & 0 & 1.5 & -1 & 0 \\ 3.5/3 & -7/3 & 0 & 7/3 & -3.5/3 \end{pmatrix} \begin{pmatrix} Gn-1 \\ Cn-1 \\ Yn \\ Gn \\ Cn \end{pmatrix}$$

where Yn, Gn and Cn are color signals for the n−th picture element, Yn−1, gn−1 and Cn−1 are color signals for the (n−1)th picture element, and In is a brightness signal and C1n and C2n are color-difference signals for the n−th picture element.

11. The apparatus according claim 9, wherein said color light receiving element array is arranged to produce color signals of yellow (Y), green (G) and cyan (C) for each picture element, and said interpolation operation circuit means is arranged to perform an operation as follows:

$$\begin{pmatrix} In \\ C1n \\ C2n \end{pmatrix} = \begin{pmatrix} 1/6 & 1/3 & 1/3 & 1/6 \\ -0.5 & 0 & 1.5 & -1 \\ 7/3 & -3.5 & 0 & 3.5/3 \end{pmatrix} \begin{pmatrix} Gn-1 \\ Cn-1 \\ Yn \\ Gn \end{pmatrix}$$

where Yn, Gn and Cn are color signals for the n−th picture element, Yn−1, Gn−1 and Cn−1 are color signals for the (n−1)th picture element, In is a brightness signal, and C1n and C2n are color-difference signals for the n−th picture element.

* * * * *